United States Patent [19]

Muller

[11] Patent Number: 4,697,971
[45] Date of Patent: Oct. 6, 1987

[54] PERFECT BINDER

[75] Inventor: Hans Muller, Zofingen, Switzerland

[73] Assignee: Grapha-Holding AG, Hergiswil, Switzerland

[21] Appl. No.: 852,298

[22] Filed: Apr. 15, 1986

[30] Foreign Application Priority Data

Apr. 18, 1985 [CH] Switzerland ............. 01677/85

[51] Int. Cl.[4] .............................. B42B 5/00
[52] U.S. Cl. ........................ 412/33; 412/16
[58] Field of Search ................... 412/16, 33

[56] References Cited

U.S. PATENT DOCUMENTS 1,346,799 7/1920 Juengst .................... 412/13
3,830,358 8/1974 Desontis .................. 412/13 X

FOREIGN PATENT DOCUMENTS 1262221 3/1968 Fed. Rep. of Germany.

Primary Examiner—Paul A. Bell
Attorney, Agent, or Firm—Peter K. Kontler

[57] ABSTRACT

A perfect binder wherein a horizontal table defines an endless oval track for a series of articulately connected tongs each of which has a fixed jaw and a pivotable jaw. The pivotable jaws are articulately connected to discrete levers each of which is pivotable between a first end position in which the work-engaging portions of the jaws cooperate to clamp a stack of sheets between them, and a second end position in which the work-engaging portion of the pivotable jaw is remote from the work-engaging portion of the fixed jaw. Coil springs are provided to urge the levers to either of their end positions. A first fixed cam is provided along the track to pivot the levers to their operative positions before the freshly inserted stacks reach the first treating station, and a second cam is provided adjacent a further portion of the track to pivot the levers to the other end positions in which the treated stacks of sheets can be released or withdrawn. The pivotable jaws of the tongs are mounted on the respective frames for pivotal movement about horizontal axes which are parallel to straight stretches of the endless track. The book-engaging portions are disposed at the lower ends of the jaws.

16 Claims, 2 Drawing Figures

PERFECT BINDER

BACKGROUND OF THE INVENTION

The present invention relates to bookbinding machines in general, and more particularly to improvements in bookbinding machines of the type referred to as perfect binders.

It is known to combine the tongs of a perfect binder into an endless chain and to provide each tongs with two clamping jaws one of which is movable relative to the other so as to clamp a stack of sheets during transport of the stack along one or more treating stations. The tongs are pushed along an endless path, and the means for biasing the one jaw toward the other jaw normally comprises springs. Reference may be had to DE-AS 1 262 221.

A drawback of conventional perfect binders is that, if the tongs are not extremely rigid and bulky, the movable jaws are likely to jam during clamping of relatively small stacks of overlapping sheets. Any jamming of movable jaws in their tracks entails a non-uniform distribution of stresses along that edge of the corresponding stack which is clamped between the book-engaging portions of the respective jaws. This affects the quality of the ultimate products.

Attempts to overcome such drawbacks of conventional perfect binders include the utilization of extremely heavy and bulky tongs which, in turn, necessitates the provision of heavy and sturdy tracks for the followers of frames which carry the jaws of the respective tongs. Moreover, such heavy and bulky tongs cannot be readily transported in stepwise fashion at elevated speeds. Relatively heavy and bulky tongs cannot be accelerated and/or decelerated within short intervals of time.

A further drawback of conventional bookbinding machines of the type known as perfect binders is that each of the tongs must be provided with a substantial number of relatively heavy and strong springs which urge the book-engaging portions of movable jaws toward the book-engaging portions of the complementary jaws. This can be accomplished only if the tracks for the tongs are machined with a high degree of precision and the followers of the frames forming part of the tongs are guided in such tracks with a minimum of play. All this contributes to the initial and maintenance cost of conventional perfect binders.

OBJECTS AND SUMMARY OF THE INVENTION

An object of the invention is to provide a perfect binder wherein lightweight tongs can be utilized to reliably clamp selected edges of stacked paper sheets or the like during travel of sheets along one or more treating stations.

Another object of the invention is to provide a machine wherein relatively small and lightweight jaws can exert a substantial force which suffices to properly clamp relatively thick and large as well as relatively thin and small stacks of paper sheets or the like.

Another object of the invention is to provide a perfect binder wherein the magnitude of forces with which the jaws of tongs engage the stacks of paper sheets does not depend on the thickness and/or other dimensions of such stacks.

An additional object of the invention is to provide novel and improved means for guiding the tongs of a perfect binder during travel along an endless track.

An additional object of the invention is to provide novel and improved tongs for use in the above outlined perfect binder.

A further object of the invention is to provide novel and improved means for moving the movable jaws of tongs in a perfect binder relative to each other.

Still another object of the invention is to provide a novel and improved method of reliably clamping selected edges of stacked paper sheets or the like during treatment in a perfect binder.

A further object of the invention is to provide the perfect binder with novel and improved means for advancing the tongs along their endless track.

The invention is embodied in a bookbinding machine, particularly a perfect binder, which comprises a support defining an endless track disposed in a predetermined plane (preferably in a substantially horizontal plane), a series of tongs each of which includes a frame provided with follower means serving to travel along the track, and first and second jaws mounted on the frame and having book-engaging portions. Each frame has a pivot member defining a predetermined axis which is substantially parallel to the plane of the track and at least the first jaw of each tongs is mounted in the respective frame for pivotal movement of its book-engaging portion about the respective predetermined axis toward and away from the book-engaging portion of the respective second jaw. The machine further comprises means for moving the first jaws relative to the respective second jaws, and such moving means includes first pivoting means for pivoting the book-engaging portions of the first jaws of successive tongs of the series toward the book-engaging portions of the respective second jaws during travel along a predetermined first portion of the track, and second pivoting means for pivoting the book-engaging portions of the first jaws away from the book-engaging portions of the respective second jaws during travel of the respective tongs along a second portion of the track. The arrangement is preferably such that the jaws include lower portions which constitute the book-engaging portions and upper portions which are carried by the respective frames. The moving means preferably further comprises means for biasing the book-engaging portions of the first jaws toward the book-engaging portions of the respective second jaws during travel of the respective tongs from the first toward the second portion of the track.

In accordance with a presently preferred embodiment of the invention, the second jaws are fixedly mounted in the respective frames and the moving means further comprises discrete levers which are mounted in the frames and are pivotable by the first and second pivoting means between first and second end positions in which the book-engaging portions of the respective first and second jaws are nearer to and more distant from each other, respectively. Such moving means preferably further comprises resilient means for yieldably biasing the levers to their first end positions. The levers are preferably pivotable in the respective frames about second axes which are at least substantially parallel to the respective predetermined axes. Each lever can comprise a first arm and each first jaw can be provided with a second arm. One of these arms can be provided with a cam face and the other of the arms is provided with a wiper which engages the cam face. The arrangement is preferably such that the cam faces are provided on the arms of the first jaws and such arms are disposed in first planes which are substantially parallel to the planes of the arms of the corresponding levers. The wipers are preferably movable along arcuate paths whose centers are located on the respective second axes, and the cam faces make acute angles with the respective paths, at least in the first positions of the respective lever.

Each of the aforementioned biasing means can comprise a coil spring for each of the levers, and each such spring is preferably arranged to yieldably bias the respective lever in each of the two end positions so that the book-engaging portion of the first jaw is urged toward the book-engaging portion of the respective second jaw in the first end position and that the book-engaging portion of each first jaw is urged away from the book-engaging portion of the respective second jaw in the second end position of the respective lever.

Each first jaw can be rigid or integral with the respective pivot member, and the frames can be rigid or integral with the respective second jaws and can include bearings for the pivot members of the corresponding first jaws. Each first jaw can comprise a plurality of legs which extend substantially radially of the respective pivot member, and the book-engaging portions of the first jaws can include elongated rails which are carried by the respective legs.

Each lever can further comprise a second arm which carries a roller follower, and each of the pivoting means can comprise a stationary cam which is tracked by the roller followers of the second arms of the levers of successive tongs during travel of such tongs along the corresponding portions of the track.

The support can include a substantially plate-like member or table having an endless guide surface which is disposed substantially at right angles to the plane of the track. Such plane is preferably at least substantially horizontal, and the plate-like member has an upper side and an underside. Each of the follower means includes first and second followers which are provided on the respective frame and respectively track the upper side and the underside of the plate-like member, and each follower means further comprises at least one third follower which tracks the guide surface on the plate-like member. Each of the followers can comprise at least one roller, and the axes of rollers which form part of the first and second followers are preferably normal to the axes of rollers which form part of the respective third followers.

The machine further comprises links or other suitable means for articulately connecting the frames of neighboring tongs of the series of tongs to each other. The track preferably includes at least one elongated straight stretch, and each frame preferably includes an elongated straight toothed rack. The racks of those frames which are advanced along the straight stretch of the track are aligned with each other, and the machine then further comprises a driven gear which mates with successive racks advancing along the elongated stretch of the track.

The novel features which are considered as characteristic of the invention are set forth in particular in the appended claims. The improved machine itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
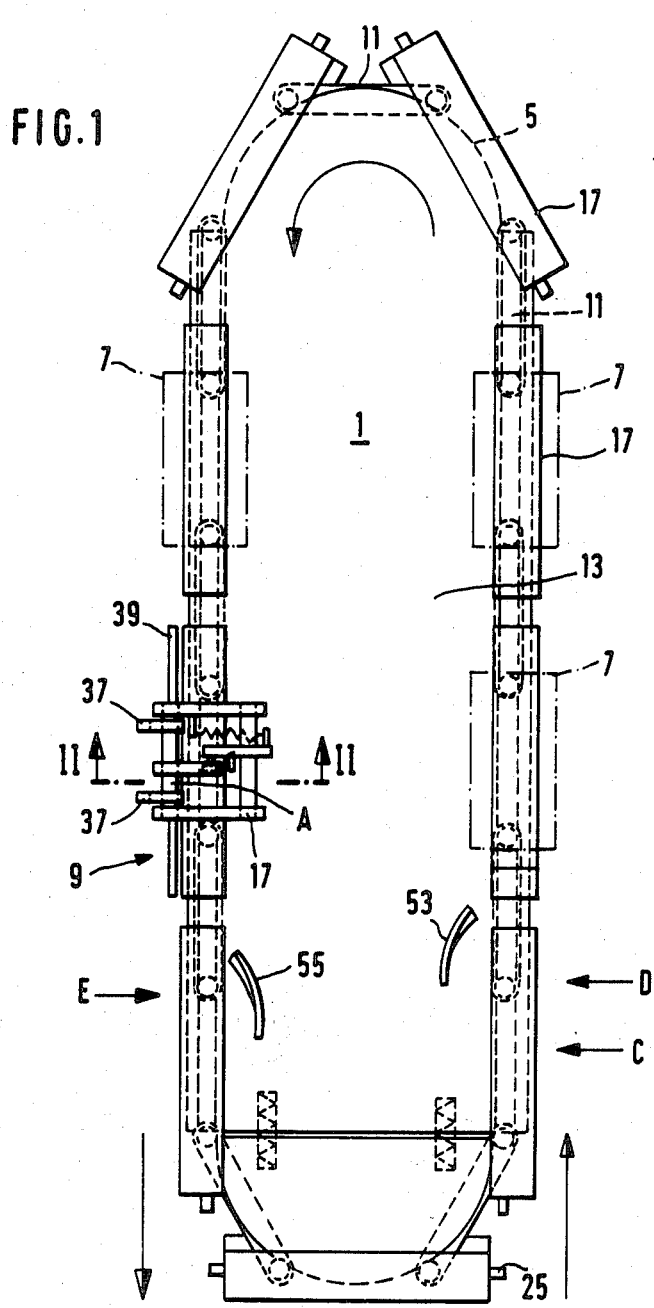
FIG. 1 is a schematic plan view of a perfect binder which embodies the present invention.

FIG. 1 shows a perfect binder 1 wherein a substantially plate-like support 13 in the form of a horizontal table defines an endless substantially oval track 5 disposed in a substantially horizontal plane and serving to guide a series of nine-neighboring tongs 9 along a plurality of treating stations 7. Such stations can be provided with means for trimming, coating with adhesive, applying textile strips to and/or otherwise treating a succession of stacks 31 (FIG. 2) each of which consists of a predetermined number of overlapping paper sheets. Neighboring tongs 9 are articulately connected to each other by links 11 so that they form an endless chain which is advanced in a counterclockwise direction, as viewed in FIG. 1. The table 13 has a horizontal upper side, a horizontal underside, and an endless oval groove machined into the underside. The inner side of such groove is bounded by an endless guide surface 15 which is normal to the general plane of the track 5. The end portions of the table 13 and track 5 are suitably rounded so as to allow for travel of the tongs 9 from the left-hand elongated straight stretch to the right-hand elongated straight stretch of the track 5 at the bottom of FIG. 1 and from the right-hand stretch to the left-hand stretch at the top of FIG. 1.

Each of the tongs 9 comprises an elongated frame 17 the lower portion of which carries suitably distributed follower means tracking the table 13 so as to ensure that the tongs 9 will travel along the track 5. The followers on each of the frames 17 comprise one or more upper roller followers 19 which track the upper side of the table 13, one or more lower roller followers 21 which track the underside of the table 13, and one or more roller followers 23 which are disposed in the groove in the underside of the table 13 and track the guide surface 15 therein. The axes of the roller followers 23 are normal to the axes of the roller followers 19 and 21. The just described distribution of the axes of roller followers 19, 21, 23 on each of the frames 17 allows for highly accurate guidance of the tongs 9 along the track 5 with a minimum of vibratory and other stray movements.

Each of the frames 17 carries an elongated straight toothed rack 25 which is disposed at a level below the guide surface 15 and is parallel with the left-hand or right-hand elongated straight stretch of the track 5 during travel of the corresponding tongs 9 along such stretch. The means for advancing the tongs 9 along the track 5 comprises a driven gear 27 (e.g., a relatively small pinion) which mates with successive racks 25 during travel of such racks along the left-hand elongated stretch of the track 5, as seen in FIG. 1. The driven frame 17 then pushes the preceding frame through the medium of the respective link 11, and the driven frame 17 pulls the next-following frame 17 through the medium of the corresponding link 11. The racks 25 below the left-hand stretch of the track 5 in FIG. 1 preferably form a substantially uninterrupted composite rack to ensure proper penetration of teeth of the rotating driven gear 27 into the tooth spaces of successibe racks while the bookbinding machine is in actual use.

Each frame 17 carries a jaw 29 which extends downwardly along the periphery of the table 13 and to a level below the surface 15. The lowermost part 29a of the jaw 29 constitutes a book-engaging portion which can cooperate with the book-engaging portion 39 of a mobile jaw 33 on the respective frame 17. The jaw 29 extends substantially vertically, i.e., at right angles to the general plane of the table 13, and can constitute an integral part of the respective frame 17. Each frame 17 has bearings 17a for a horizontal pivot member A which is parallel to the plane of the table 13 and is integral or rigidly connected with the upper portion of the respective pivotable jaw 33. The pivot member A is parallel to the book-engaging portion 29a of the respective fixed jaw 29.

The means for moving the book-engaging portions 39 of the jaws 33 of successive tongs 9 toward and away from the book-engaging portions 29a of the respective fixed jaws 29 comprises discrete levers 35 which are mounted on pivot members B carried by the respective frames 17. The axes of pivot members B are parallel to the axes of the respective pivot members A. Such axes extend at right angles to the plane of FIG. 2 in the respective positions of the tongs 9 relative to the track 5. The arrangement is preferably such that each jaw 33 is pivotable through an angle of substantially 90 degrees between the solid-line operative position and the phantom-line inoperative position of FIG. 2.

Each jaw 33 comprises two or more elongated parallel legs 37 which extend substantially radially of the respective pivot member A and carry an elongated rail which constitutes the corresponding book-engaging portion 39. The free edge of the rail 39 bears against the adjacent outermost sheet of the stack 31 which is placed between the jaws 29 and 33 so that the rail 39 cooperates with the portion 29a of the jaw 29 to firmly hold the sheets of the stack 31 in regions closely adjacent to the lower edge face of the stack 31. This ensures that the sheets of the stack 31 cannot shift their positions relative to each other and/or relative to the jaws 29, 33 during travel through the treating stations 7 which are adjacent to the straight stretches of the track 5.

Figure 2:
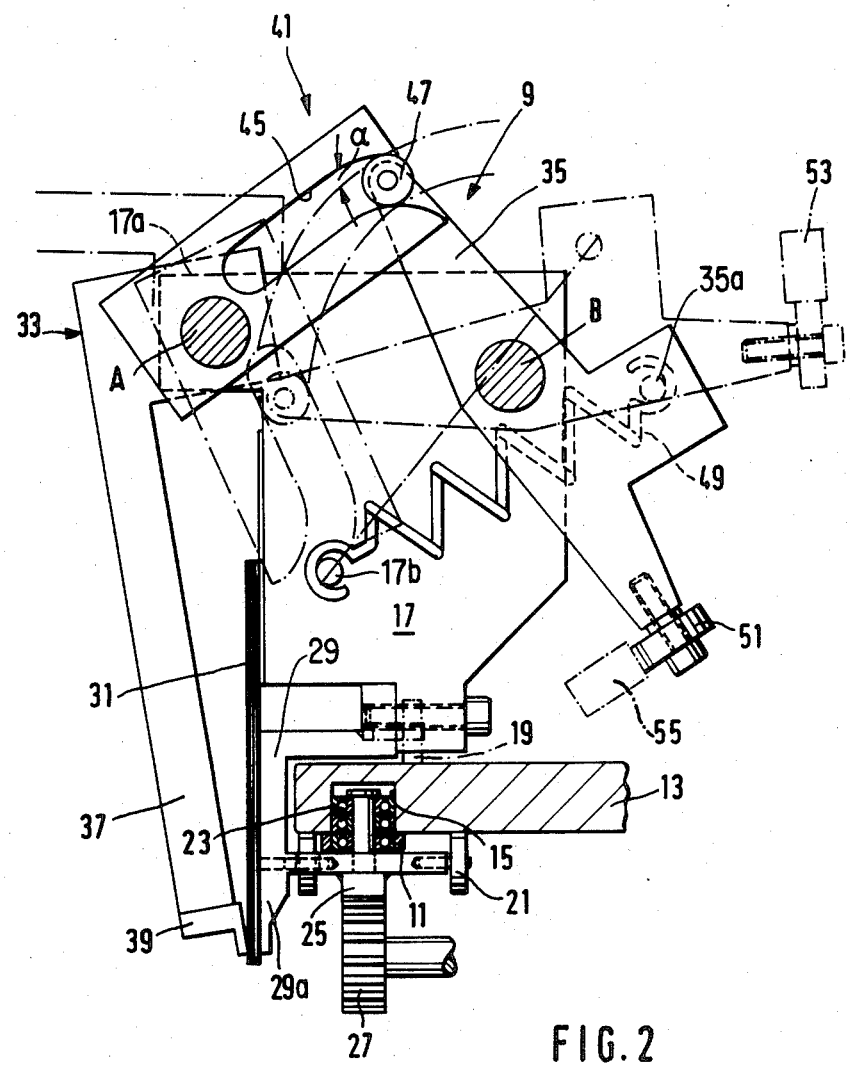
FIG. 2 is an enlarged fragmentary transverse vertical sectional view as seen in the direction of arrows from the line II—II of FIG. 1.

Each pivotable jaw 33 comprises an elongated arm 41 which is provided with an arcuate cam face 45 engaged by a roller-shaped wiper 47 on the adjacent arm of the respective lever 35. The lever 35 is pivotable between the solid-line and phantom-line positions of FIG. 2 whereby its wiper 47 travels along an arcuate path (shown in FIG. 2 by phantom lines) whose center of curvature is located on the axis of the respective pivot member B. Such path of the wiper 47 and the cam face 45 of the respective arm 41 make a relatively small acute angle alpha when the lever 35 assumes that end position which is indicated in FIG. 2 by solid lines. Such end position of the lever 35 corresponds to the operative (solid-line) position of the respective pivotable jaw 33. The angle alpha is preferably smaller than 45 degrees. This ensures that the tongs 9 can properly grip relatively thick as well as medium-thick and relatively thin stacks 31 with the same degree of reliability and with the same closing force. In other words, the closing force which is furnished by the book-engaging portions 29a, 39 of the jaws 29, 33 is not dependent upon the thicknesses of stacks 31 which are being treated in the machine 1.

The means for moving the pivotable jaws 33 between their operative and inoperative positions further comprises discrete coil springs 49 each of which has a first end portion anchored on a stud 17b in the respective frame 17 and a second end portion attached to a stud 35a of the respective lever 35. The straight line connecting the studs 17b and 35a in one end position of the lever 35 is located at one side of the axis of the pivot member B, and such line is located at the other side of the axis of the pivot member B when the jaw 33 side pivoted to its inoperative position. This ensures that the spring 49 can bias the respective lever 35 to either of its end positions as soon as the lever moves beyond an intermediate dead-center position in which the line connecting the axis of the pivot member B with the axis of the stud 35a coincides with the line connecting the studs 17b and 35a.

The configuration of the cam face 45 in each of the arms 41 is such that a relatively weak spring 49 can cause the corresponding pivotable jaw 33 to urge its book-engaging portion 39 against the outer side of the adjacent sheet of the stack 31 with a pronounced force so as to establish a highly satisfactory clamping action.

Those arms of the levers 35 which extend away from the respective wipers 47 carry roller followers 51. The roller followers 51 of the levers 35 on successive frames 17 track a first stationary cam 53 during travel along a first portion of the track 5 (see FIG. 1) whereby the levers 35 are pivoted from the phantom-line to the solid-line positions and cause the corresponding jaws 33 to move their book-engaging portions 39 nearer to the book-engaging portions 29a of the respective fixed jaws 29. A second stationary cam 55 is adjacent to another portion of the track 5 and serves to pivot the oncoming levers 35 from their solid-line to their phantom-line positions. The axis of each roller follower 51 is preferably normal to the axis of the respective pivot member B. Once a lever 35 is pivoted to a position corresponding to the solid-line position of the lever 35 shown in FIG. 2, such lever remains in this position during travel of the corresponding frame 17 along all of the treating stations 7. The lever which reaches the cam 55 is pivoted to the other end position so as to allow for removal of the treated stack 31 from the machine 1.

The mode of operation of the improved machine 1 is as follows: The reference character C denotes in FIG. 1 the station where discrete stacks 31 are introduced between the jaws 29, 33 of successive tongs 9 while the pivotable jaws 33 are held in their inoperative positions. The means for feeding stacks 31 into the range of oncoming tongs 9 is known in the art and forms no part of the present invention. The introduction of stacks 31 is completed at the time when the respective tongs 9 reach the station D where the roller followers 51 engage the stationary cam 53 and cause the corresponding levers 35 to move toward and beyond their dead-center positions so that the springs 49 are free to rapidly propel the book-engaging portions 39 toward the respective book-engaging portions 29a with the result that the stacks 31 are properly clamped close to their bottom edge faces. The cam 53 causes the oncoming levers 35 to pivot in a counterclockwise direction, as viewed in FIG. 2. The force-transmitting ratio of the levers 35 is very pronounced. This is attributable, in part, to the configuration of the cam faces 45. The end result is that relatively lightweight jaws 29, 33 can properly clamp relatively thin, medium thick or very thick stacks 31 with the same degree of reliability even though the tongs 9 need not utilize strong coil springs 49. The levers 35 remain in their solid-line positions during travel of the respective tongs from the station D toward and beyond all of the treating stations 7. Once a lever 35 reaches the station E of FIG. 1, its roller follower 51 is engaged by the stationary cam 55 so that the book-engaging portion 39 of the respective jaw 33 moves away from the book-engaging portion 29a of the associated fixed jaw 29 and the finished stack 31 can be withdrawn or discharged by gravity feed. The cam 55 is designed to pivot successive levers 35 in a clockwise direction, as viewed in FIG. 2. This entails a movement of the studs 35a to the other sides of the axes of the respective pivot members B so that the springs 49 then compel the respective levers 35 to remain in the end positions corresponding to the phantom-line position of the lever 35 shown in FIG. 2.

The aforedescribed construction of the tongs 9, according to which one of the jaws 29, 33 is fixed to or integral with the respective frame 17, contributes to simplicity and lower weight of the tongs. The provision of the levers 35 which transmit motion to the associated pivotable jaws 33 enables the respective springs 49 to urge the book-engaging portions 39 toward the associated book-engaging portions 29a with a substantial force even when the tongs 9 are of lightweight design. This contributes to lower weight of such tongs and renders it possible to operate the machine at a higher frequency. Each lever 35 can be biased by two or more coil springs 49 and/or by other types of resilient means without departing from the spirit of the invention. The provision of arms 41 and their cam faces 45 renders it possible to ensure the transmission of pronounced clamping forces even if the stacks 31 are relatively thin. The aforediscussed selection of the magnitude of angle alpha also contributes to the transmission of pronounced clamping forces.

The mounting of coil springs 49 in such a way that they are capable of biasing the respective levers 35 to either of their end positions also contributes to the lower cost and lower weight of the tongs 9 because it is not necessary to provide a first set of springs to urge the levers 35 to first end positions and a second set of springs to urge the levers 35 to second end positions. In many conventional bookbinding machines, the movable jaws of the tongs are held in open positions by specially designed blocking elements.

The aforediscussed construction of the tongs 9, with the pivot members A turnable together with the jaws 33 relative to the bearings 17a of the corresponding frames 17, contributes to simplicity and lower weight of the tongs. Furthermore, such construction ensures that the rail-shaped book engaging portions 39 of the jaws 33 exert a uniform and constant pressure against the outer sides of the adjacent sheets of the stacks 31 during each stage of operation of the machine. Such uniformity is ensured regardless of the format of the stacks 31. The arrangement is preferably such that each frame 17 is provided with two bearings 17a, one at the leading end and the other at the trailing end of the respective tongs 9. This also contributes to uniformity of the clamping force which is applied by the respective book-engaging portion 39. The utilization of book-engaging portions 39 in the form of elongated rails which are mounted at the ends of legs 37 also promotes the uniformity of distribution of forces which are transmitted to the stacks 31 during treatment at the stations 7.

The illustrated distribution of followers 19, 21 and 23 on each of the frames 17 reduces the likelihood of development of the so-called polygon effect in the regions where the tongs 9 travel along arcuate portions of the endless track 5. This is of particular importance if the tongs 9 are of lightweight construction and the machine is operated at an elevated speed.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A bookbinding machine comprising a support defining an endless track which is disposed in a predetermined plane; a series of tongs each including a frame provided with follower means arranged to travel along said track and first and second jaws mounted on the frame and having book-engaging portions, each frame having a pivot member defining a predetermined axis which is substantially parallel to said plane and at least the first jaw of each of said tongs being mounted in the respective frame for pivotal movement of its book-engaging portion about the respective axis toward and away from the book-engaging portion of the respective second jaw; and means for moving said first jaws relative to the respective second jaws, including a lever mounted on each of said frames for pivotal movement about a second axis which is substantially parallel to the respective predetermined axis and arranged to move the respective first jaw, resilient means for biasing the levers to first positions in which the book-engaging portions of the respective jaws cooperate to clamp a book between them and second positions in which the book-engaging portions of the respective jaws are inoperative, means interposed between said levers and the respective first jaws for magnifying the force with which said biasing means act upon the respective first jaws through the medium of the corresponding levers, first pivoting means for pivoting the levers on the frames of successive tongs of said series toward the first positions during travel along a first portion of said track, and second pivoting means for pivoting the levers to said second positions during travel of the respective tongs along a second portion of said track.

2. The machine of claim 1, wherein said jaws include lower portions which constitute said book-engaging portions and upper portions which are carried by the respective frames.

3. The machine of claim 1, wherein said second jaws are fixedly mounted in the respective frames.

4. The machine of claim 3, wherein each of said levers has a first arm and each of said first jaws has a second arm, each of said force magnifying means comprising a cam face on one of the respective arms and a wiper provided on the other of the respective arms and engaging the corresponding cam face.

5. The machine of claim 3, wherein each of said first jaws is rigid with the respective pivot member and said frames include bearings for the respective pivot members.

6. The machine of claim 3, wherein each of said first jaws comprises a plurality of legs extending substantially radially of the respective pivot members and the book-engaging portions of said first jaws include elongated rails carried by the respective legs.

7. The machine of claim 3, wherein each of said levers includes a first arm which is articulately connected with the respective first jaw by the corresponding force magnifying means and a second arm, each of said pivoting means comprising a cam which is tracked by the second arms of the levers of successive tongs during travel of such tongs along the respective portions of said track.

8. The machine of claim 1, wherein said support includes a substantially plate-like member having an endless guide surface disposed substantially at right angles to said plane, said plane being substantially horizontal and said member having an upper side and an underside, each of said follower means including first and second followers provided on the respective frame and respectively tracking the upper side and the underside of said member, each of said follower means further comprising at least one third follower tracking said guide surface.

9. The machine of claim 8, wherein each of said followers comprises at least one roller and the axes of the rollers of said first and second followers are normal to the axes of the rollers of the respective third followers.

10. The machine of claim 1, further comprising links articulately connecting the frames of neighboring tongs of said series to each other.

11. The machine of claim 10, wherein said track includes at least one elongated straight stretch and each of said frames includes an elongated straight toothed rack, the racks of those frames which are advanced along said stretch being aligned with each other and further comprising a driven gear mating with successive racks advancing along said stretch.

12. A bookbinding machine comprising a support defining an endless track which is disposed in a predetermined plane; a series of tongs each including a frame provided with follower means arranged to travel along said track and first and second jaws mounted on the frame and having book-engaging portions, each frame having a pivot member defining a predetermined axis which is substantially parallel to said plane and the first jaw of each of said tongs being mounted in the respective frame for pivotal movement of its book-engaging portion about the respective axis toward and away from the book-engaging portion of the respective second jaw, said second jaws being fixedly mounted in the respective frames; and means for moving said first jaws relative to the respective second jaws, including first pivoting means for pivoting the book-engaging portions of the first jaws of successive tongs of said series toward the book-engaging portions of the respective second jaws during travel along a first portion of said track, second pivoting means for pivoting the book-engaging portions of said first jaws away from the book-engaging portions of the respective second jaws during travel of the respective tongs along a second portion of said track, and a lever mounted on each of said frames and pivotable by said first and second pivoting means between first and second positions in which the book-engaging portions of the respective first and second jaws are nearer to and more distant from each other, respectively, each of said levers having a first arm and each of said first jaws having a second arm, one of said arms having a cam face and the other of said arms having a wiper engaging the cam face.

13. The machine of claim 12, wherein the cam faces are provided on the arms of said first jaws and such arms are disposed in first planes, said first arms being disposed in second planes which are substantially parallel to the respective first planes.

14. The machine of claim 13, wherein said wipers are movable along arcuate paths with the centers of curvature of such paths located on the respective second axes, and said cam faces make with the respective paths acute angles in the first end positions of the respective levers.

15. A bookbinding machine comprising a support defining an endless track which is disposed in a predetermined plane; a series of tongs each including a frame provided with follower means arranged to travel along said track and first and second jaws mounted on the frame and having book-engaging portions, each frame having a pivot member defining a predetermined axis which is substantially parallel to said plane and the first jaw of each of said tongs being mounted in the respective frame for pivotal movement of its book-engaging portion about the respective axis toward and away from the book-engaging portion of the respective second jaw, said second jaws being fixedly mounted in the respective frames; and means for moving said first jaws relative to the respective second jaws, including first pivoting means for pivoting the book-engaging portions of the first jaws of successive tongs of said series toward the book-engaging portions of the respective second jaws during travel along a first portion of said track, second pivoting means for pivoting the book-engaging portions of said first jaws away from the book-engaging portions of the respective second jaws during travel of the respective tongs along a second portion of said track, a lever mounted on each of said frames and pivotable by said first and second pivoting means between first and second end positions in which the book-engaging portions of the respective first and second jaws are nearer to and more distant from each other, respectively, and a discrete spring for each of said levers, each of said springs being arranged to yieldably bias the respective lever in each of said first and second end positions so that the book-engaging portion of the first jaw is urged toward the book-engaging portion of the respective second jaw in the first end position and that the book-engaging portion of each first jaw is urged away from the book-engaging portion of the respective second jaw in the second end position of the respective lever.

16. A bookbinding machine comprising a support defining an endless track which is disposed in a predetermined plane; a series of tongs each including a frame provided with follower means arranged to travel along said track and first and second jaws mounted on the frame and having book-engaging portions, each frame having a pivot member defining a predetermined axis which is substantially parallel to said plane and at least the first jaw of each of said tongs being mounted in the respective frame for pivotal movement of its book-engaging portion about the respective axis toward and away from the book-engaging portion of the respective second jaw; links articulately connecting the frames of neighboring tongs of said series to each other, said track including at least one elongated straight stretch and each of said frames including an elongated straight toothed rack, the racks of those frames which are advanced along said straight stretch being aligned with each other; a driven gear mating with successive racks advancing along said stretch; and means for moving said first jaws relative to the respective second jaws, including first pivoting means for pivoting the book-engaging portions of the first jaws of successive tongs of said series toward the book-engaging portions of the respective second jaws during travel along a first portion of said track, and second pivoting means for pivoting the book-engaging portions of said first jaws away from the book-engaging portions of the respective second jaws during travel of the respective tongs along a second portion of said track.

* * * * *